3,776,913
CERTAIN DITHIO-CARBAMATE DERIVATIVES OF 5-HYDROXYMETHYL-PICOLINIC ACID

Hiroyoshi Hidaka, Nagoya, and Ikuo Matsumoto and Junji Yoshizawa, Tokyo, Japan, assignors to Banyu Pharmaceutical Co., Ltd., Tokyo, and Hiroyoshi Hidaka, Nagoya-shi, Japan
No Drawing. Filed Apr. 17, 1972, Ser. No. 244,904
Claims priority, application Japan, Apr. 16, 1971, 46/23,892; Nov. 29, 1971, 46/95,282
Int. Cl. C07d 29/10, 31/50
U.S. Cl. 260—293.69           1 Claim

ABSTRACT OF THE DISCLOSURE

Picolinic acid derivates having the formula:

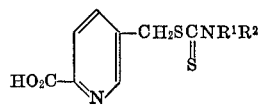

wherein $R^1$ represents a lower alkyl group; and $R^2$ represents hydrogen or a lower alkyl group, or $R^1$ and $R^2$ together may form a heterocyclic ring with nitrogen; can be prepared by reacting 5-(hydroxy or halo-methyl)-picolinic acid or ester thereof with an alkylisocyanate or dithiocarbamates, and if the ester is formed, hydrolyzing said ester to the acid form. These compounds have been proven to be effective anti-inflammatory agents or anti-allergic agents and have been found to be physiologically active to the circulatory system, nervous system, and to the sensory organs.

BACKGROUND OF THE INVENTION

Field of the invention

This invention relates to novel picolinic acid derivatives. More particularly, this invention relates to the use of picolinic acid derivatives as physiologically active agents for the circulatory system or the nervous system, and have been found to be effective as agents, especially for hypertension, Parkinson's disease, alcoholism, schizophrenia, and manic-depressive paranoia.

SUMMARY OF THE INVENTION

It is one object of this invention to provide novel picolinic acid derivatives.

It is another object of this invention to provide a process for preparing novel picolinic acid derivatives.

It is still another object of this invention to provide a new use for certain picolinic acid derivatives.

The novel picolinic acid derivative of this invention is a compound having the formula:

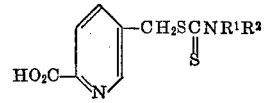

wherein $R^1$ represents a lower alkyl group; $R^2$ represents hydrogen or a lower alkyl group, or $R^1$ and $R^2$ taken together may form a heterocyclic ring with the nitrogen atom; and Y represents sulfur atom.

Typical compounds having this formula include:

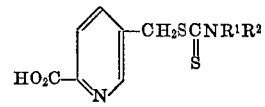
(I)

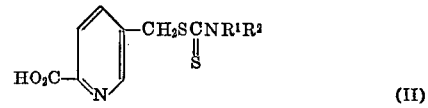
(II)

wherein $R^1$ represents a lower alkyl group; and $R^2$ represents hydrogen or a lower alkyl group, or $R^1$ and $R^2$ taken together may form a heterocyclic ring with the nitrogen atom.

DETAILED DESCRIPTION OF THE PREFERRED EMBODIMENTS

The picolinic acid derivative having the formula:

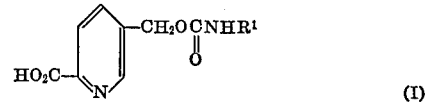
(I)

can be prepared by reacting 5-(hydroxymethyl)picolinic acid with alkylisocyanate. The alkylisocyanate is preferably a lower alkylisocyanate, such as methylisocyanate, ethylisocyanate or propylisocyanate. The addition reaction of the alkylisocyanate and 5-(hydroxymethyl)-picolinic acid is preferably conducted as a homogeneous system in an inert organic solvent. It is preferable to use pyridine as the inert organic solvent.

After the reaction, the solvent is distillated from the reaction mixture and the residue is dissolved in an aqueous alkaline solution and extracted with chloroform to remove the byproducts. The water phase is then neutralized to precipitate the product.

The starting reactant 5-(hydroxymethyl)-picolinic acid is also a novel compound, and can be prepared by the following reaction:

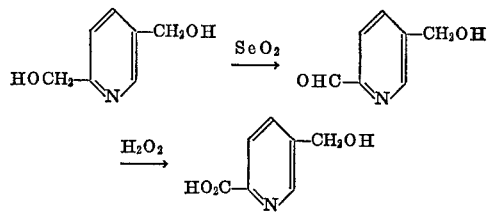

In the above reaction, the hydroxymethyl group in the 2-position of the 2,5-dihydroxymethyl-pyridine is selectively oxidized by using 0.5 molar equivalent of $SeO_2$ to yield 2-formyl-5-hydroxymethyl-pyridine. The 2-formyl group is oxidized to the carboxyl group by using hydrogen peroxide in the absence of a catalyst, at a cool temperature. The 5-(hydroxymethyl)-picolinic acid obtained can thereafter be easily isolated by conventional methods.

The picolinic acid derivative having the formula:

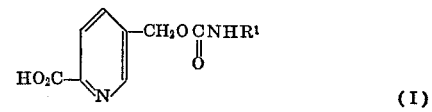
(I)

can also be prepared by reacting alkylisocyanate with a 5-(hydroxymethyl)-picolinic ester of the formula:

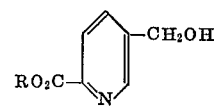

wherein R represents a lower alkyl group; to yield a picolinic ester having the formula:

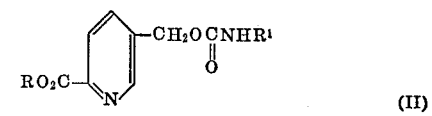
(II)

wherein R¹ represents a lower alkyl group, and R represents a lower alkyl group; and then hydrolyzing the product under alkaline conditions.

As above-mentioned, the compound having the Formula I can be prepared by reacting 5-(hydroxymethyl)-picolinic acid with alkylisocyanate. However, the alkylisocyanate is reacted not only with the hydroxy group of the side-chain, but it will also react with the free carboxyl group, to yield a large quantity of byproducts. Rather complex isolation procedures are therefore required to isolate the product from the reaction mixture, therefore reducing the yield. If the 5-(hydroxymethyl)-picolinic acid in the above-described reaction is replaced with the corresponding alkyl ester thereof, and the alkyl ester will react with alkylisocyanate, and a picolinic ester derivative, having the Formula III will be obtained in high yield as a single compound which is quite easily isolatable.

The particular ester group present on the Compound III ester will depend upon the particular reactant and by the carbamic ester. Only the ester group based on the reactants will be selectively hydrolyzed to obtain the intended product.

It has now been found that the desirable compound can be obtained by hydrolyzing under alkaline conditions. Any alkali which is used for conventional hydrolysis of esters, may be used herein. For instance, the alkali may be an aqueous solution or an aqueous alcohol solution of sodium hydroxide, potassium hydroxide or barium hydroxide.

Hydrolyzation may be effected by suspending the ester in an alkaline solution, at room temperature, while stirring. In order to prevent secondary hydrolysis, it is desirable to effect the reaction at relatively low temperatures in a dilute alkaline solution containing 1.1–1.5 equivalents of alkali, and to neutralize the hydrolyzed product at an early stage of the reaction. The compound having the Formula I obtained by the neutralization is easily purified by recrystallization, and yields of 95% or higher have been attained.

If 5-(hydroxymethyl)-picolinic acid alkyl ester is replaced with 6-(hydroxymethyl)-picolinic acid alkyl ester, the compound having the formula:

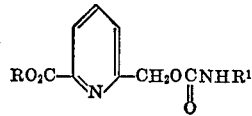

will be obtained.

The picolinic acid derivative having the formula:

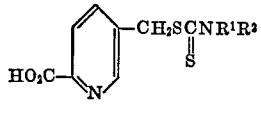

(II)

wherein R¹ represents a lower alkyl group and R² represents hydrogen atom or a lower alkyl group, or R¹ and R² together may form a heterocyclic ring with the nitrogen atom; can be prepared by reacting the 5-(halomethyl)-picolinic ester of the formula:

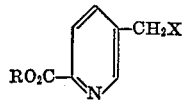

wherein R represents a lower alkyl; and X represents halogen; with a metal salt or amine salt of dithiocarbamic acid of the formula:

wherein R¹ represents a lower alkyl group; R² represents hydrogen or a lower alkyl group, or R¹ and R² taken together may form a heterocyclic ring with the nitrogen atom; to yield a dithiocarbamate derivative having the formula:

(IV)

which is then selectively hydrolyzed to convert the ester group in the 2 position to the corresponding acid.

Exemplary of the R¹ substituent are methyl, ethyl, propyl, and isopropyl groups.

Exemplary of R² are hydrogen, methyl and ethyl groups. R¹ and R² together may form a heterocyclic ring, such as pyrrolidine, piperidine, hexahydroazepine, morpholine, piperazine. The X substituent of the ester is a halogen, such as chlorine or bromine atom. The R of the ester is a lower alkyl group, such as methyl or ethyl.

The 5 - (halomethyl)-picolinic esters are novel compounds and can be prepared by reacting thionyl chloride with 5-(hydroxymethyl)-picolinic ester. The salts of dithiocarbamic acid can be prepared by reacting carbon disulfide with 2 molar equivalents of amine, wherein alternatively 1 molar equivalent of amine may be replaced with another basic compound, such as an alkali hydroxide, or triethylamine. When 1 molar equivalent of sodium hydroxide is used, the sodium salt of dithiocarbamic acid is produced by the reaction:

$$R^1R^2NH + CS_2 + NaOH \rightarrow R^1R^2NC(:S)SNa$$

It is also possible to use Ag, Zn, Mn or Pb salts of dithiocarbamic acid as S-alkylation reagents. It is preferable to use an inert, neutral solvent, which can dissolve the halogen in the S-alkylation reaction. Suitable solvents include hydrous or anhydrous acetone or a lower alcohol.

The reaction will go to completion within a short period of time at a temperature of about 0° C. When the reaction mixture is diluted with water, dithiocarbamate derivatives having the Formula IV can be obtained in high yields.

The Compound IV may be hydrolyzed in an acidic or alkaline solution, with or without previous isolation, to selectively hydrolyze only the ester group in the 2-position, in order to yield a picolinic acid derivative having the Formula II.

The novel compounds of this invention have been shown to be effective as physiologically active agents for the circulatory system, for the nervous system and have good utility as anti-allergic agents, especially for hypertension, Parkinson's disease, alcoholism, schizophrenia or manic-depressive.

According to psychosis in vitro tests, the novel compounds of this invention will inhibit dopamine-β-hydroxylase at quite low concentrations, as follows:

| Concentration: | Inhibition rate of dopamine-β-hydroxylase |
|---|---|
| 1×10⁻⁶ M | 88 |
| 5×10⁻⁶ M | 82 |
| 1×10⁻⁷ M | 60 |
| 5×10⁻⁸ M | 48 |
| 1×10⁻⁸ M | 20 |

Accordingly, the quantity of catecholamine in the tissues may be affected by the administration of a compound of this invention, so that diseases caused by the presence of catecholamine in the tissue, such as circulatory system disease including hypertension; and nervous system disorders such as Parkinson's disease, and manic-depressive psychosis can be treated with the compounds of this invention. It is known that changes in the level of catecholamines in the brain will cause correlative changes in the rate of release of growth hormones or ACTH (from hypophysis). The compounds of this invention have been shown to be effective for treatment of diseases resulting from unusually large secretions of the hormone, such as dwarfish growth. When the compound of this invention is administered to mice (Wistar strain), it has been found that the level of catecholamines in the tissue of the brain, heart, adrenal gland, etc. is decreased.

For example, the catecholamine level in the brain, heart, and adrenal gland decreased by the oral administration of the following compound at a dose of 50 mg./kg. to a rat, after 3 hours, as compared with a control specimen.

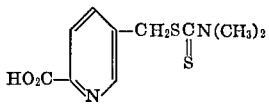

|  | Noradrenalin in the tissue (μg./g. tissue) | Dopamine in the tissue (μg./g. tissue) |
| --- | --- | --- |
| Brain | 25% decrease | 20% increase. |
| Heart | 20% decrease | 10% increase. |
| Adrenal gland | 30% decrease | 25% increase. |

The Compound I was orally administered to a rabbit (Australian strain) at a dose of 50 mg./kg. The blood pressure began to decrease after 15 minutes from the time of the administration and decreased 20% after 1 hour and 30% after 3 hours. The decrease of blood pressure continued after 5 hours, after which the blood pressure returned to normal levels. This reduction in blood pressure was statistically significant, and shows the effectiveness of the compound of this invention.

When other compounds having the Formula I and II were similarly used, similar results were obtained.

Having generally described the invention, a more complete understanding can be attained by reference to certain specific examples which are provided herein for purposes of illustration only and are not intended to be limiting in any manner unless otherwise specified.

EXAMPLE 1

2.0 g. of 5-(hydroxymethyl)-picolinic acid was dissolved in 40 ml. of pyridine anhydrate and then 1.5 ml. of methylisocyanate was added to the solution to react at room temperature overnight. It was then heated at 80° C. for 1 hour. The pyridine was stripped from the reaction mixture. The residual product was dissolved in a 0.1 N-sodium hydroxide aqueous solution and the by-products were removed by extraction with chloroform. The water phase was neutralized with 2 N HCl to a pH of 4.0, and then it was dried under reduced pressure.

The residual product was extracted with chloroform while heating, and the extract was dried and recrystallized from a 90% ethanol solution. As the result, a picolinic acid derivative having the following formula, which is the colorless capillary needle-like crystal having a melting point of 157–158° C. was obtained. The compound has a solubility of 7.1% in water at 20° C.

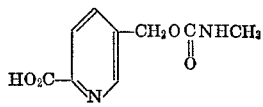

Elementary analysis—($C_9H_{10}N_2O_4$): Calculated value: C, 51.42%; H, 4.80%; N, 13.33%. Analyzed value: C, 51.43%; H, 4.84%; N, 13.18%.

The reactant 5-(hydroxymethyl)-picolinic acid was prepared by the following method:

2.8 g. of 2,5-dihydroxymethyl-pyridine and 1.1 g. of selenium dioxide were suspended in 20 ml. of dioxane and the mixture was heated to 80° C. and stirred for 2.5 hours. The metallic selenium precipitated from the reaction mixture was filtered and washed with water. The washing was admixed with the filtrate and the mixture was dried under reduced pressure. The residual product was dissolved in 10 ml. of water and 3 ml. of 30% hydrogen peroxide aqueous solution was added thereto and stirred at room temperature for 2 hours. The mixture was permitted to stand overnight. The remaining hydrogen peroxide was decomposed by use of a platinum catalyst and the reaction mixture was concentrated to precipitate 2.6 g. of 5-(hydroxymethyl)-picolinic acid in the form of colorless capillary needle-like crystals of a melting point (decomposition) of 216° C. The yield was 84%.

Elementary analysis—($C_7H_7NO_3$): Calculated value: C, 54.90%; H, 4.61%; N, 9.15%. Analyzed value: C, 54.76%; H, 4.60%; N, 8.92%.

EXAMPLE 2

7.4 g. of 5-(hydroxymethyl)-picolinic acid methyl ester hydrochloride (crystal M.P. 146° C.) was dissolved in 8 ml. of water and was neutralized with sodium hydrogen carbonate, and then extracted with chloroform and stripped to yield 6.5 g. of 5-(hydroxymethyl)-picolinic acid methyl ester in oily form. The product was dissolved in 50 ml. of chloroform and 3.0 ml. of methylisocyanate and 10 ml. of pyridine were added to the solution. The mixture was heated at 35° C. for 3 hours and then at 60° C. for 2 hours. The reaction mixture was dried under reduced pressure, and was recrystallized from water.

As a result, 8.1 g. of the picolinic acid ester derivative having the following formula, which is a colorless needle-like crystal having a melting point of 131–132° C. was obtained. The yield was 98%.

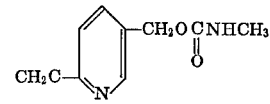

Elementary analysis—($C_{10}H_{12}N_2O_4$): Calculated value: C, 53.53%; H, 5.39%; N, 12.50%. Analyzed value: C, 53.52%; H, 5.41%; N, 12.51%.

7.0 g. of said picolinic acid ester derivative was suspended in 75 m. (1.2 equivalent) of 0.5 N NaOH and was substantially dissolved within 5–10 minutes by stirring at room temperature.

The compound was hydrolyzed over a period of 30 minutes and then 18.7 ml. of 2 N HCl was added to the reaction mixture to effect neutralization and then was dried under reduced pressure. The residual product was extracted with a mixture of 1:1 of methanol:ethyl acetate while heating. The extract was concentrated and was recrystallized from 90% ethanol. As a result, 6.8 g. of picolinic acid derivative having the following formula, which is a colorless, needle-like crystal, having a melting point of 157–158° C. was obtained. The yield was 95%.

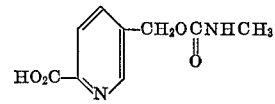

Elementary analysis—($C_9H_{10}N_2O_4$): Calculated value: C, 51.42%; H, 4.80%; N, 13.33%. Analyzed value: C, 51.43%; H, 4.84%; N, 13.18%.

2.5 g. of carbamate derivative (M.P. 80° C.) which was prepared by reacting 6-(hydroxymethyl)-picolinic acid methyl ester with methyl isocyanate, was suspended in 27 ml. (1.2 equivalent) of 0.5 N NaOH and was stirred at room temperature for 30 minutes. The reaction mixture was neutralized with 6.7 ml. of 2 N HCl and was dried under reduced pressure.

The compound was extracted with a mixture of 1:1 of methanol:ethyl acetate while heating, and then was recrystallized with ethyl acetate. As a result, 2.3 g. of picolinic acid derivative having the following formula ($R=CH_3$), which is a colorless needle-like crystal having a melting point of 132.5–134° C. was obtained. The yield was 98%.

When the resulting compound was mixed with the standard compound which was separately prepared and the mixture was comelted, no decrease in melting point was observed and the infrared spectrograph of the resulting compound was the same as that of the standard compound

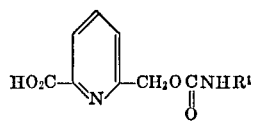

wherein R¹ is CH₃.

In accordance with said process, methyl isocyanate was replaced with ethyl isocyanate or propyl isocyanate. As a result, each of the following compounds were obtained:

A compound having said formula wherein: R¹ is $C_2H_5$; M.P. 145° C.

A compound having said formula wherein: R¹ is $CH(CH_3)_2$; M.P. 128° C.

EXAMPLE 3

Preparation of 5-(chloromethyl)-picolinic acid ethyl ester 1.0 g. of 5 - (hydroxymethyl) - picolinic acid ethyl ester was admixed with 5 ml. of thionyl chloride and heated for 1 hour. Thionyl chloride was then stripped and water was added and the solution was neutralized with sodium hydrogen carbonate. The product was extracted with chloroform and the extract of chloroform was distillated to yield 1.0 g. of 5-(chloromethyl)-picolinic acid ethyl ester (yield: 91%).

The compound had a boiling point of 117° C./mm. Hg. The hydrochloride salt of the resulting compound was recrystallized from a mixture of methanol-ethyl ester, and was found to be a colorless needle-like crystal having a melting point of 149–150° C.

Elementary analysis—($C_9H_{10}ClNO_2$·HCl): Calculated value: C, 45.79%; H, 4.70%; N, 5.93%; Cl, 30.03%. Analyzed value: C, 45.54%; H, 4.61%; N, 5.93%; Cl, 30.15%.

Preparation of picolinic acid dithiocarbamate derivative 1.2 g. of sodium N,N-dimethyldithiocarbamate was dissolved in 10 ml. of hydrous acetone (water:acetone is 2:10 in volume) and was cooled to 0–5° C. 1.5 g. of 5-(chloromethyl)-picolinic acid ethyl ester was dissolved in 5 ml. of acetone and was added dropwise to said solution. The mixture was stirred at 0–5° C. for 40 minutes, and the reaction mixture was diluted with water. A hydrate intermediate compound having the following formula, was precipitated. The compound which was recrystallized from hydrous ethanol had a melting point of 52–53° C. The yield was 1.8 g. (80%). The anhydrous compound prepared by drying under reduced pressure was in an oily form.

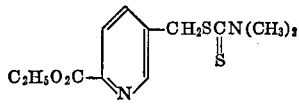

Elementary analysis—($C_{12}H_{16}N_2O_2S_2$·$H_2O$): Calculated value: C, 47.68%; H, 6.00%; N, 9.27%; S, 21.17%. Analyzed value: C, 48.28%; H, 5.57%; N, 9.38%; S, 21.16%.

1.42 g. of said intermediate was suspended in 24 ml. of 0.25 N NaOH and was stirred at room temperature for 2 hours. The compound was hydrolyzed to permit dissolution. The reaction mixture was neutralized with hydrochloroic acid. The precipitate was recrystallized from hydrous ethanol to yield dithiocarbamate having the following formula:

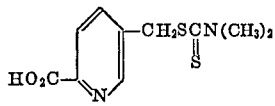

Melting point: 136–138° C.
Yield: 1.1 g. (92%).

Elementary analysis—($C_{10}H_{12}N_2O_2S_2$): Calculated value: C, 46.88%; H, 4.72%; N, 10.93%; S, 24.98%. Analyzed value: C, 46.98%; H, 4.70%; N, 10.92%; S, 24.82%.

EXAMPLE 4

1.0 g. of sodium N,N-pentamethylene dithiocarbamate was dissolved in 10 ml. of hydrous acetone (water:acetone of 2:10 in volume) and was cooled to 0–5° C. 1.0 g. of 5-(chloromethyl)-picolinic acid ethyl ester was dissolved in 4 ml. of acetone and was added dropwise to said solution. The mixture was stirred at 0–5° C. for 40 minutes, and then the reaction mixture was diluted and the compound was extracted with chloroform. The extract was dried and chloroform was stripped, to yield 1.6 g. of the colorless oily intermediate having the following formula:

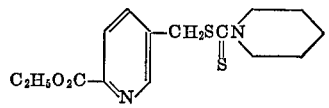

1.6 g. of said intermediate was dissolved in 12 ml. of ethanol. 12 ml. of 0.5 N NaOH was added to the solution and reacted at room temperature while stirring for 2 hours. The reaction mixture was neutralized with hydrochloric acid and diluted with water. The precipitate was recrystallized from hydrous acetone to yield the dithiocarbamate derivative having the following formula:

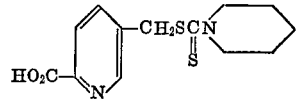

Melting point: 142° C.
Yield: 1.25 g. (84.5%).

Elementary analysis—($C_{13}H_{14}N_2O_2S_2$): Calculated value: C, 52.70%; H, 5.44%; N, 9.46%; S, 21.60%. Analyzed value: C, 52.21%; H, 5.58%; N, 9.44%; S, 21.58%.

EXAMPLE 5

1.1 g. of sodium N-isopropyl dithiocarbamate was dissolved in 10 ml. of hydrous acetone (water:acetone is 2:10 in volume) and was cooled to 0–5° C. 1.1 g. of 5-(chloromethyl)-picolinic acid ethyl ester was dissolved in 4 ml. of acetone and was added dropwise to said solution. The mixture was stirred at 0–5° C. for 40 minutes and the reaction mixture was diluted with water. The precipitate was recrystallized from methanol, to yield 1.5 g. of an intermediate having a melting point of 131–133° C. and the following formula. The yield was 1.5 g. (96%).

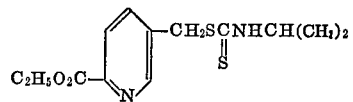

Elementary analysis—($C_{13}H_{18}N_2O_2S_2$): Calculated value: C, 52.34%; H, 6.08%; N, 9.39%; S, 21.46%. Analyzed value: C, 52.8%; H, 6.07%; N, 9.38%; S, 21.58%.

0.3 g. of said intermediate was suspended in 3.0 ml. of 25 w./w. percent sulfuric acid and was heated to its reflux temperature for 2 hours. The reaction mixture was neutralized to pH 3.5 with 10% sodium carbonate aqueous solution. The precipitate was recrystallized from ethanol to yield a dithiocarbamate derivative having the following formula:

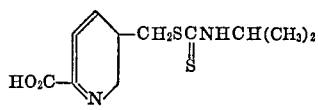

Melting point: 174–176° C.
Yield: 0.26 g. (95%).

Elementary analysis—Calculated value: C, 48.89%; H, 5.22%; N, 10.37%; S, 23.68%; Analyzed value: C, 49.16%; H, 5.25%; N, 10.18%; S, 23.54%.

Having now fully described the invention, it will be apparent to one of ordinary skill in the art that many changes and modifications can be made thereto without departing from the spirit or scope of the invention. Accordingly,

What is claimed and intended to be covered by letters patent is:

1. A picolinic acid derivative having the formula:

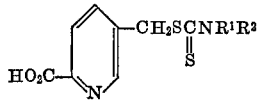

wherein $R^1$ represents a lower alkyl group and $R^2$ represents hydrogen or a lower alkyl group or $R^1$ and $R^2$ taken together with the nitrogen atom to which they are attached from a piperidine ring.

References Cited

UNITED STATES PATENTS 3,501,485  3/1970  Shimamoto et al. ___ 260—293.69

FOREIGN PATENTS 1,200,199  7/1970  Great Britain ____ 260—295.5 C

OTHER REFERENCES

Matsumoto et al., Chem. Abstracts, vol. 72, No. 11, Item 55, 269m Mar. 16, 1970.

ALAN L. ROTMAN, Primary Examiner

U.S. Cl. X.R.

260—294.8 E, 295.5 C; 424—266, 267